United States Patent
Smith

(10) Patent No.: US 9,988,929 B2
(45) Date of Patent: Jun. 5, 2018

(54) BORESCOPE PLUG FOR GAS TURBINE ENGINE

(71) Applicant: UNITED TECHNOLOGIES CORPORATION, Hartford, CT (US)

(72) Inventor: Darren M Smith, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 550 days.

(21) Appl. No.: 14/590,108

(22) Filed: Jan. 6, 2015

(65) Prior Publication Data

US 2016/0194976 A1 Jul. 7, 2016

(51) Int. Cl.
*F01D 21/00* (2006.01)
*G02B 23/24* (2006.01)

(52) U.S. Cl.
CPC ....... *F01D 21/003* (2013.01); *G02B 23/2492* (2013.01); *F05D 2260/83* (2013.01)

(58) Field of Classification Search
CPC ........................... F01D 21/003; G02B 23/2492
See application file for complete search history.

(56) References Cited

U.S. PATENT DOCUMENTS

| | | | |
|---|---|---|---|
| 3,519,363 A * | 7/1970 | Sanger | G01B 5/12 33/299 |
| 3,690,775 A * | 9/1972 | Cousins | G02B 6/4428 356/241.4 |
| 4,591,794 A | 5/1986 | Shattuck et al. | |
| 4,815,276 A * | 3/1989 | Hansel | F01D 21/003 415/118 |
| 4,941,456 A | 7/1990 | Wood et al. | |
| 5,076,660 A | 12/1991 | Messinger | |
| 5,115,636 A | 5/1992 | Zeiser | |
| 5,362,110 A | 11/1994 | Bynum | |
| 5,867,976 A | 2/1999 | Ziegler, Jr. | |
| 5,897,277 A * | 4/1999 | Barre | F01D 21/003 411/120 |
| 6,468,033 B1 | 10/2002 | Weidlich | |
| 7,721,435 B2 | 5/2010 | Stokes | |
| 8,246,298 B2 | 8/2012 | Wilson et al. | |
| 8,511,970 B2 | 8/2013 | Ottow et al. | |
| 2011/0255914 A1* | 10/2011 | Bynum | B25B 23/141 403/348 |
| 2016/0097412 A1* | 4/2016 | Bynum | F16B 2/10 403/327 |
| 2017/0067361 A1* | 3/2017 | Bynum | G02B 23/2476 |

OTHER PUBLICATIONS

Moeller Manufacturing Co; Precision Machined Turbine Engine Components; Click-Loc Plugs and Drain Plug; http://www.moelleraircraft.com/ asdplug1.htm.

* cited by examiner

*Primary Examiner* — Woody Lee, Jr.
(74) *Attorney, Agent, or Firm* — Bachman & LaPointe, P.C.

(57) ABSTRACT

A borescope plug includes a threaded section that extends from a head section along an axis, the threaded section including a central passage along said axis. A spindle is located within the central passage. A multiple of detents are positioned in response to an axial position of the spindle along the axis.

16 Claims, 4 Drawing Sheets

BORESCOPE PLUG FOR GAS TURBINE ENGINE

BACKGROUND

The present disclosure relates to a gas turbine engine and, more particularly, to a borescope plug therefore.

Borescope inspection (BSI) ports facilitate on-wing inspection of aircraft engine primary gaspath hardware with a fiber optic borescope to expedite frequent engine inspections that otherwise may require disassembly. Borescope plugs seal the inspection ports during engine operation to minimize secondary flow leakage into the primary gaspath.

BSI ports are typically directly integrated into the engine case geometry and are positioned to facilitate maintenance accessibility without removal of engine hardware. Oftentimes, the engine case is dense with external hardware such as gearboxes, pumps, air conduits and fluid conduits that may complicate access to the borescope plug.

Current borescope plugs require a supplementary locking feature other than lock wire or safety cable. Which may be expensive and difficult to incorporate in certain locations

SUMMARY

A borescope plug according to one disclosed non-limiting embodiment of the present disclosure includes a head section that forms a tool socket along an axis; a threaded section that extends from the head section along the axis, the threaded section including a central passage along the axis; a spindle within the central passage; and a multiple of detents that are positioned in response to an axial position of the spindle along the axis.

A further embodiment of the present disclosure includes, wherein the tool socket is generally square in cross-section.

A further embodiment of any of the foregoing embodiments of the present disclosure includes, wherein the tool socket includes a multiple of transverse apertures.

A further embodiment of any of the foregoing embodiments of the present disclosure includes, wherein the tool socket is configured to receive a ratchet extension.

A further embodiment of any of the foregoing embodiments of the present disclosure includes, wherein the multiple of detents are arranged transverse to the borescope plug axis.

A further embodiment of any of the foregoing embodiments of the present disclosure includes, wherein the multiple of detents are arranged in a waist section between the head section and the threaded section.

A further embodiment of any of the foregoing embodiments of the present disclosure includes, wherein the head section is of a diameter greater than the threaded section.

A further embodiment of any of the foregoing embodiments of the present disclosure includes, wherein the waist section is of a diameter greater than the threaded section and less than the head section.

A further embodiment of any of the foregoing embodiments of the present disclosure includes a seal mounted to the waist section.

A further embodiment of any of the foregoing embodiments of the present disclosure includes, wherein the spindle is spring biased toward the tool socket.

A further embodiment of any of the foregoing embodiments of the present disclosure includes, wherein the spindle includes a distal end that extends at least partially into the tool socket when in a locked condition.

A further embodiment of any of the foregoing embodiments of the present disclosure includes, wherein the distal end is about flush with a floor of the tool socket when in an unlocked condition.

A further embodiment of any of the foregoing embodiments of the present disclosure includes a pressure port in communication with the central passage.

A borescope plug according to another disclosed non-limiting embodiment of the present disclosure includes a head section that forms a tool socket along an axis; a threaded section that extends from the head section along the axis, the threaded section including a central passage along the axis; a spindle within the central passage, the spindle includes a distal end that extends at least partially into the tool socket in a locked condition and is about flush with a floor of the tool socket when in an unlocked condition; and a multiple of detents arranged in a waist section between the head section and the threaded section, the multiple of detents positioned to selectively extend and retract in response to an axial position of the spindle along the axis.

A further embodiment of any of the foregoing embodiments of the present disclosure includes, wherein the spindle is spring biased toward the tool socket.

A further embodiment of any of the foregoing embodiments of the present disclosure includes, wherein the spindle includes a reduced diameter section that is aligned with the detent when in a locked condition.

A further embodiment of any of the foregoing embodiments of the present disclosure includes, wherein the reduced diameter section is displaced from the multiple of detents in an unlocked condition.

A gas turbine engine according to another disclosed non-limiting embodiment of the present disclosure includes a ring within a BSI port, the ring including a multiple of scallops; and a Borescope Inspection (BSI) plug threadably receivable within the BSI port, such that at least one of a multiple of detents of the BSI port plug is engageable with the scallops.

A further embodiment of any of the foregoing embodiments of the present disclosure includes, wherein the at least one of the multiple of detents are unlocked in response to engagement of a tool with the BSI plug.

A further embodiment of any of the foregoing embodiments of the present disclosure includes, wherein the tool is a ratchet extension.

In a further embodiment of the foregoing embodiment, the method includes locating the bushing and seal in a borescope bore through one of a multiple of bosses. In the alternative or additionally thereto, in the foregoing embodiment the second gas turbine engine component is a mid-turbine frame. In the alternative or additionally thereto, in the foregoing embodiment the other of the multiple of bosses receives a support detent which extends through said first gas turbine engine component. In the alternative or additionally thereto, in the foregoing embodiment, the method includes permitting axial and radial movement of the seal within the borescope bore.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
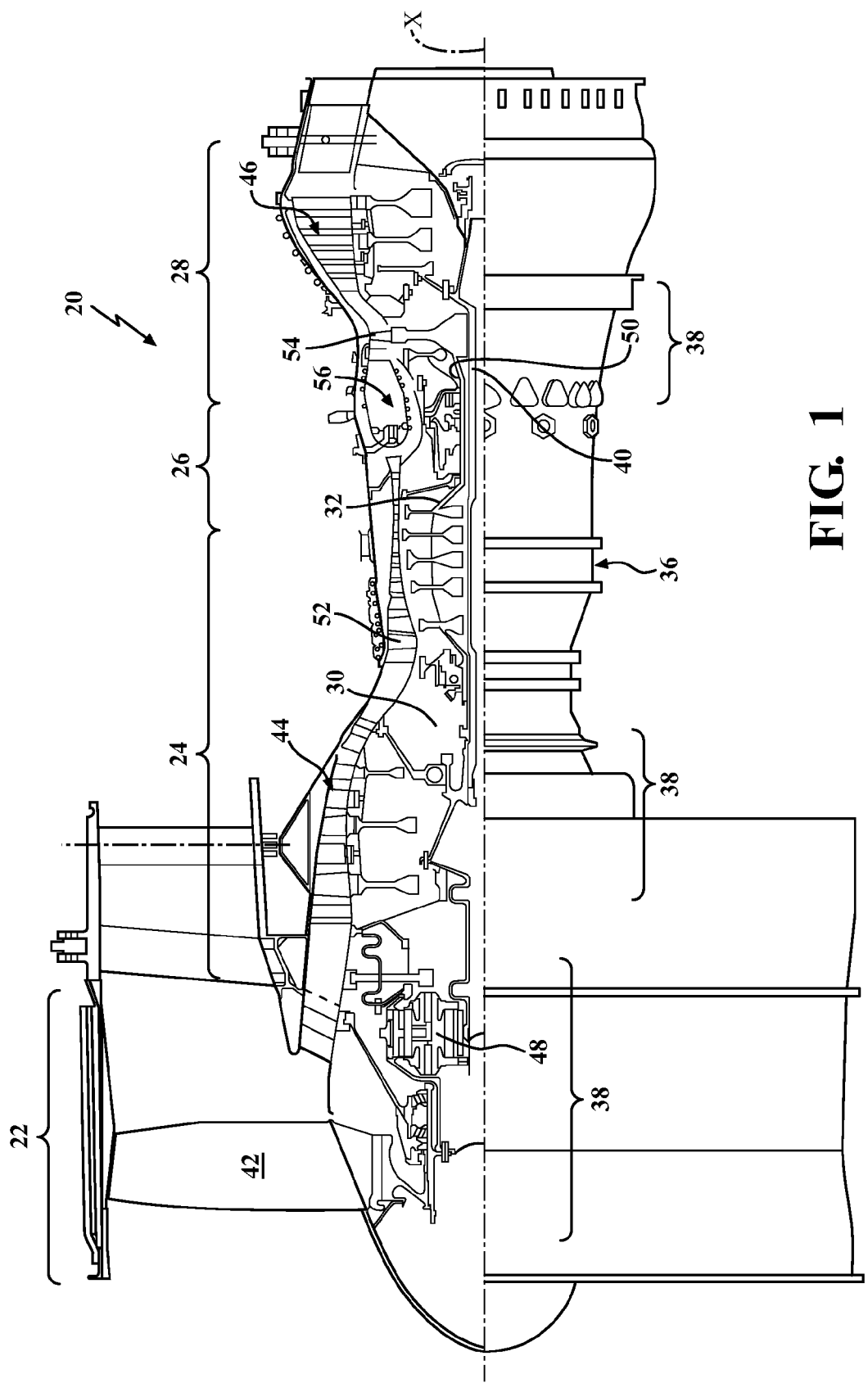
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines architectures such as a low-bypass turbofan may include an augmentor section (not shown) among other systems or features. Although schematically illustrated as a turbofan in the disclosed non-limiting embodiment, it should be appreciated that the concepts described herein are not limited to use with turbofans as the teachings may be applied to other engine architectures such as turbojets, turboshafts, open rotors, and industrial gas turbines.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44, and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

The fan section 22 drives air along a bypass flowpath and a core flowpath, while the compressor section 24 drives air along the core flowpath for compression and communication into the combustor section 26, then expansion through the turbine section 28. The core airflow is compressed by the LPC 44, then the HPC 52, mixed with the fuel and burned in the combustor 56, then expanded over the HPT 54 and the LPT 46. The HPT 54 and the LPT 46 drive the respective high spool 32 and low spool 30 in response to the expansion.

The compressor section 24 and the turbine section 28 each generally includes a multiple of stages with alternate rotationally stationary vane assemblies and rotational rotor assemblies along the core flowpath.

Figure 2:
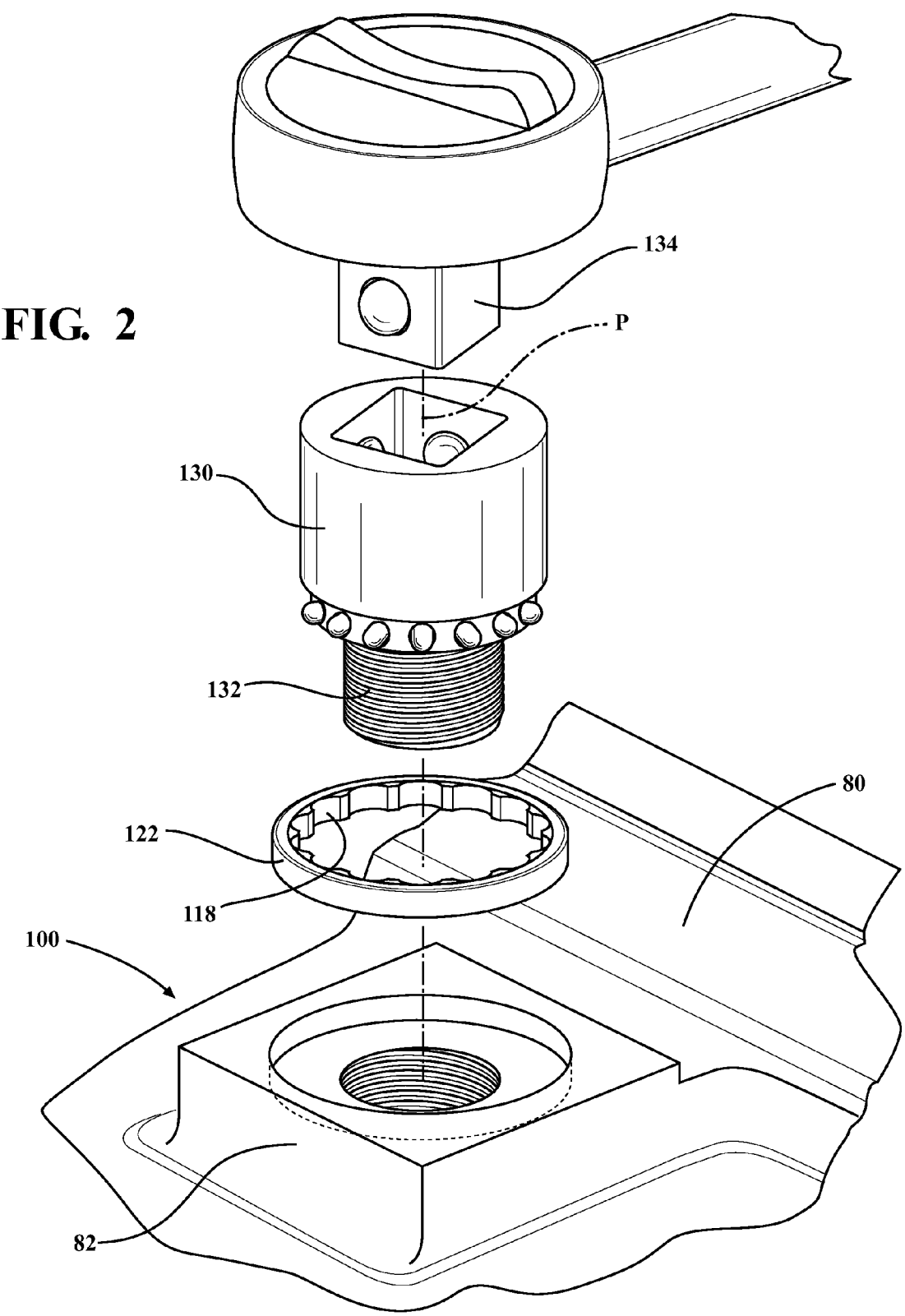
FIG. 2 is a perspective view of a Borescope Inspection (BSI) port and plug therefor in one disclosed non-limiting embodiment.

With reference to FIG. 2, each stage typically includes a Borescope Inspection (BSI) port 100 typically located to facilitate maintenance accessibility such as positions that facilitate on-wing access. The BSI port 100 extends through an outer case 80 to provide borescope access to the adjacent forward and aft airfoils. The BSI port 100 may be formed in a boss 82 or other region in the case 80.

Figure 3:
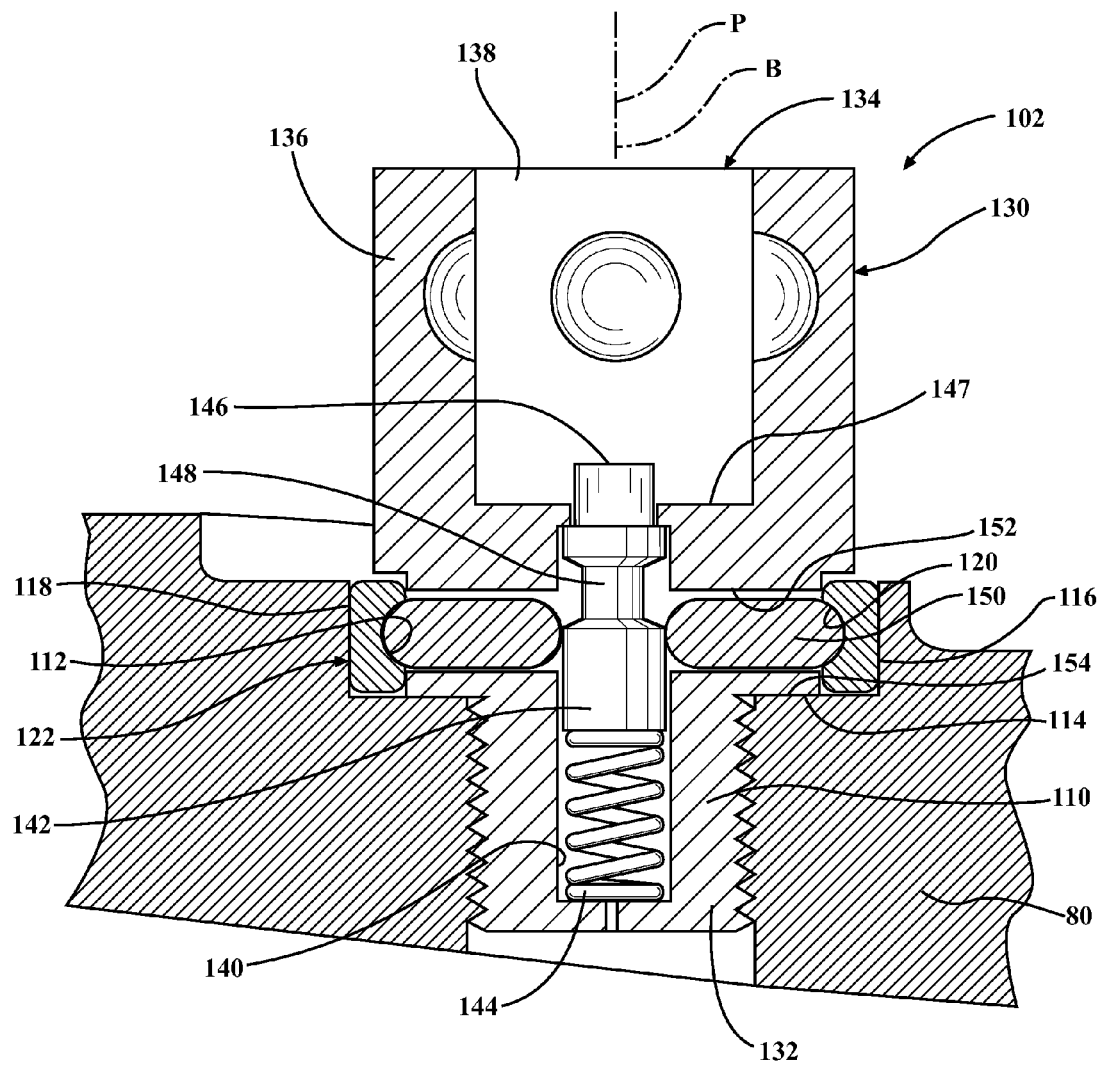
FIG. 3 is a schematic cross sectional view of a Borescope Inspection (BSI) plug in a locked condition.

With reference to FIG. 3, one example BSI port 100 is sealed with a BSI plug 102 that is threaded directly into the outer case 80. It should be appreciated that the BSI plug 102 may have various alternatively geometries to include those that extend, or are threaded, into an inner case structure.

The BSI port 100 is defined along an axis B and generally includes a threaded section 110, and a counter sunk portion 112 that forms a step surface 114 transverse to the axis B. The counter sunk portion 112 forms a diameter greater than that of the threaded section 110.

A radial wall 116 and the step surface 114 of the counter sunk portion 112 may be configured to receive a ring 118 with an inner diameter 120 that defines a multiple of scallops 122 (also shown in FIG. 2). That is, the radial wall 116 may be sized to receive the ring 118 in a press-fit type interface. The ring 118 may be manufactured of a material that matches the thermal coefficient of the case 80. Alternatively, the ring 118 may be manufactured of a material different than the case 80 to provide a more durable interface for the BSI plug 102. Alternatively still, the radial wall 116 itself may be scalloped.

The BSI plug 102 generally includes a head section 130 and a threaded section 132. In this embodiment, the head section 130 is of a relatively larger diameter than the threaded section 132, however, it should be appreciated that various shapes and configurations may alternatively be provided.

Figure 4:
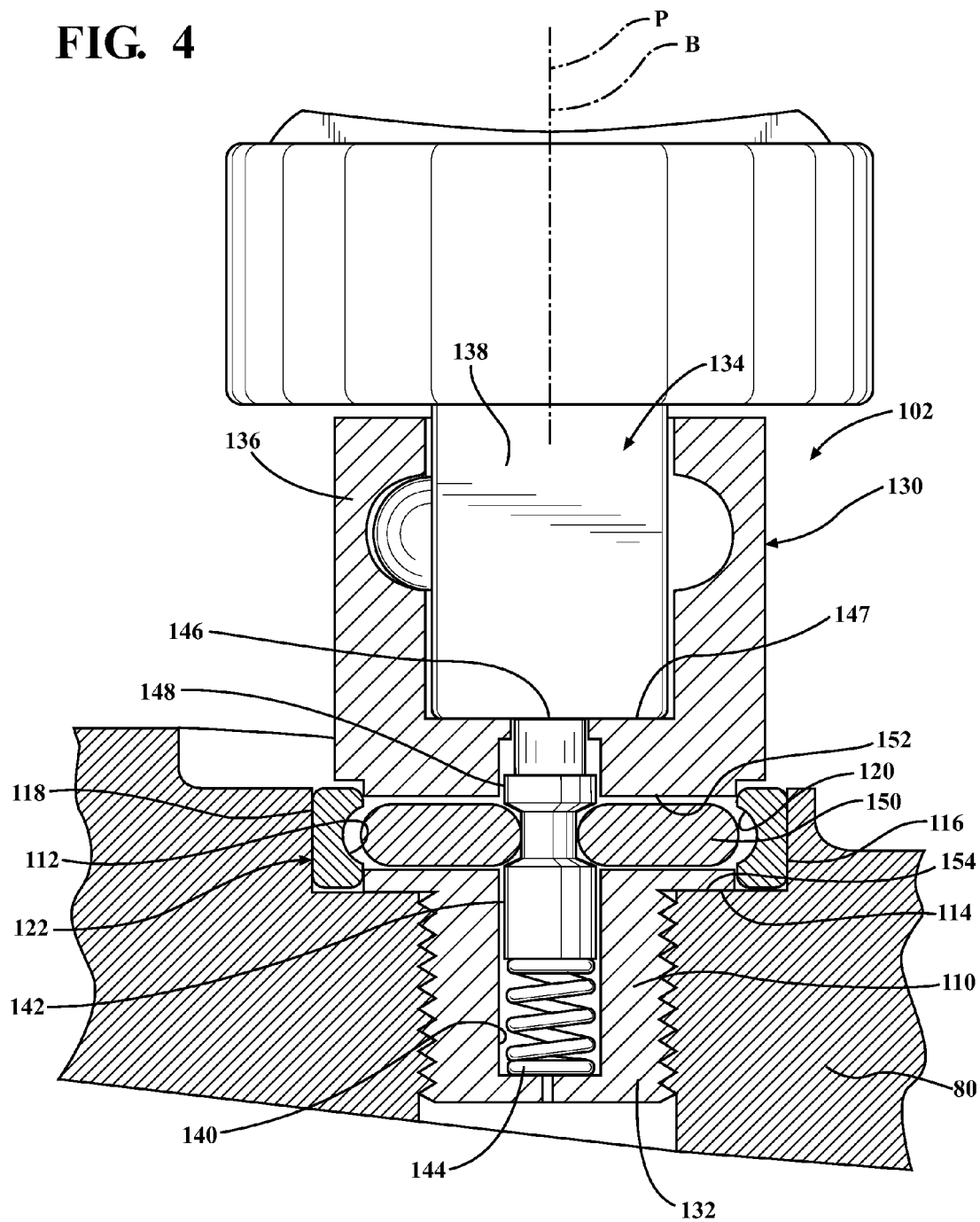
FIG. 4 is a schematic cross sectional view of the Borescope Inspection (BSI) in an unlocked condition

The head section 130 generally includes a tool socket 134 that is configured to receive a tool T such as a ratchet extension (FIG. 4). In one example, the tool socket 134 is sized to receive a tool T such as ⅜ socket extension. The tool socket 134 is sized to receive the ratchet extension such that the BSI plug 102 essentially operates as a socket and may be directly turned by the ratchet extension. In this embodiment, the tool socket 134 includes a multiple of apertures 136 within a square-shaped 138 aperture.

A central passage 140 along an axis P of the BSI plug 102 includes a spindle 142 that is spring biased toward the tool socket 134 by a spring 144. The spindle 142 is received within the central passage 140 such that a distal end 146 of the spindle 142 extends into the tool socket 134. The distal end 146 essentially forms a push-button that is pressed when the tool T is engaged within the tool socket 134.

The spindle 142 includes a reduced diameter section 148 that is aligned with one or more detents 150 that extend transverse to the axis P in response to pressure on the distal end 146 such as by the tool T engaged in the tool socket 134. It should be appreciated that although the detents are generally illustrated as pins, other members such as balls, etc may be utilized as the disclosed detents. That is, the spindle 142 and the detents 150 of the BSI plug 102 essentially operate as a positive lock pin that may often be referred to as a ball lock pin, a ball pin, a double ball pin, push button pin, quick release pin, etc.

With reference to FIG. 4, in response to insertion of the tool T into the tool socket 134, the reduced diameter section 148 is aligned with the detents 150 such that the detents 150 may retract into the BSI plug 102. That is, the bias of the spring 144 is overcome as the spindle 142 is axially driven along the axis P toward the threaded section 132 to position the reduce diameter section 148 into alignment with the detents 150. The detents 150 are thereby in an unlocked condition when the distal end 146 is about flush with a floor 147 of the tool socket 134. In this embodiment, the detents 150 are located in a waist section 152 between the head section 130 and the threaded section 132 such that the waist section 152 is receivable within the inner diameter 120 of the ring 118, however, other configurations may be provided.

While the tool T is engaged with the tool socket 134, and the detents 150 are retracted into the BSI plug 102, the BSI plug 102 may be threaded into the threaded section 110 of the BSI port 100. The BSI plug 102 may be torqued to a desired value once a step surface 154 of the waist section 152 abuts the step surface 114 of the counter sunk portion 112. At this installed position, the detents 150 are aligned with the ring 118.

After the BSI plug 102 is seated and a desired torque applied, the tool T is removed from the tool socket 134 as a socket is removed from a ratchet. Removal of the tool T results in the spindle 142 being biased toward the tool socket 134 by the spring 144, such that the reduced diameter section 148 is no longer aligned with the detents 150 (FIG. 3). That is, the spring 144 axially drives the spindle 142 along the axis P toward the locked condition. The detents 150 are thereby driven outward along their respective axis and are received into the scallops 122 of the ring 118. The BSI plug 102 is thereby rotationally locked into the BSI port 100.

In another disclosed non-limiting embodiment, a pressure port 160 may extend into the central passage 140. Location of the BSI port 100 in a high pressure region, such as the compressor section, thus results in an air pressure application to the spindle 142 through the pressure port 160 to further maintain the BSI Plug 102 in the locked condition.

In another disclosed non-limiting embodiment, a seal 170 may be located in the step surface 154 of the waist section 152 to seal with the step surface 114 of the counter sunk portion 112. The seal 170 provides further sealing of the BSI port 100.

The detents 150 thereby provides a supplementary locking feature that is integral with the BSI plug 102, yet still permits installation and removal with a standard tool.

It should be understood that relative positional terms such as "forward," "aft," "upper," "lower," "above," "below," "bottom", "top", and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A borescope plug comprising:
   a head section that forms a tool socket along an axis;
   a threaded section that extends from said head section along said axis, said threaded section including a central passage along said axis;
   a spindle within said central passage, wherein said spindle is spring biased toward said tool socket; and
   a multiple of detents that are positioned in response to an axial position of said spindle along said axis.

2. The borescope plug as recited in claim 1, wherein said tool socket is generally square in cross-section.

3. The borescope plug as recited in claim 1, wherein said tool socket includes a multiple of transverse apertures.

4. The borescope plug as recited in claim 1, wherein said tool socket is configured to receive a ratchet extension.

5. The borescope plug as recited in claim 1, wherein said multiple of detents are arranged transverse to said borescope plug axis.

6. The borescope plug as recited in claim 1, wherein said multiple of detents are arranged in a waist section between said head section and said threaded section.

7. The borescope plug as recited in claim 6, wherein said head section is of a diameter greater than said threaded section.

8. The borescope plug as recited in claim 6, wherein said waist section is of a diameter greater than said threaded section and less than said head section.

9. The borescope plug as recited in claim 6, further comprising a seal mounted to said waist section.

10. A borescope plug comprising:
    a head section that forms a tool socket along an axis;
    a threaded section that extends from said head section along said axis, said threaded section including a central passage along said axis;
    a spindle within said central passage; and
    a multiple of detents that are positioned in response to an axial position of said spindle along said axis, wherein said spindle includes a distal end that extends at least partially into said tool socket when in a locked condition.

11. The borescope plug as recited in claim 10, wherein said distal end is about flush with a floor of said tool socket when in an unlocked condition.

12. The borescope plug as recited in claim 11, further comprising a pressure port in communication with said central passage.

13. A borescope plug comprising:
    a head section that forms a tool socket along an axis;
    a threaded section that extends from said head section along said axis, said threaded section including a central passage along said axis;
    a spindle within said central passage, said spindle includes a distal end that extends at least partially into said tool socket in a locked condition and is about flush with a floor of said tool socket when in an unlocked condition; and
    a multiple of detents arranged in a waist section between said head section and said threaded section, said multiple of detents positioned to selectively extend and retract in response to an axial position of said spindle along said axis.

14. The borescope plug as recited in claim 13, wherein said spindle is spring biased toward said tool socket.

15. The borescope plug as recited in claim 14, wherein said spindle includes a reduced diameter section that is aligned with said detent when in a locked condition.

16. The borescope plug as recited in claim 15, wherein said reduced diameter section is displaced from said multiple of detents in an unlocked condition.

\* \* \* \* \*